Patented Feb. 25, 1930

1,748,180

UNITED STATES PATENT OFFICE

CHARLES D. LAWHON, OF KNOXVILLE, TENNESSEE, ASSIGNOR TO THE FULTON SYLPHON COMPANY, OF KNOXVILLE, TENNESSEE, A CORPORATION OF DELAWARE

SOLDERING FLUX

No Drawing.   Application filed June 3, 1929.   Serial No. 368,206.

This invention relates to the art of soldering, including brazing, and more particularly to a flux for use therein.

It is an object of this invention to provide a flux which can be used with temperatures lower than those required for commonly used fluxes, and which is available for use with soft solder.

Another object of this invention is to provide a flux which will efficiently clean the metal and facilitate the flow thereon of the solder.

Another object of this invention is to provide a flux which can be used with a wide variety of metals and alloys.

Another object of this invention is to provide a flux which is non-hygroscopic and non-corrosive in a dry state.

Other objects will appear as the description of the invention proceeds.

I have discovered that aniline hydrochloride, either in a solid state or in solution, is a highly efficient flux which has the above and other advantages. In its dry state it contains no free hydrogen chloride, and it is non-hygroscopic. It breaks down in the presence of heat at a temperature of about 380° F., and therefore at a temperature some 300° lower than the commonly used zinc chloride. Hence it is available for use with soft solder which melts at a temperature of about 370° F. Upon application of heat thereto hydrogen chloride is formed which cleans the metal surfaces and facilitates the flow of the solder thereon. I have found that it is equally available for soldering brass, bronze, copper, nickel and various alloys thereof.

I prefer to apply the flux in the form of a solution. Any suitable solvent, such as water or alcohol may be used, but I prefer to form a saturated solution of the aniline hydrochloride in iso-propyl alcohol. When applied to the metal, the alcohol readily evaporates, leaving aniline hydrochloride thereon, and this is broken down by heat in the manner heretofore described to free hydrogen chloride and clean the surface, facilitating the flow of solder thereon.

It will, therefore, be perceived that I have provided a soldering flux which possesses the several advantages heretofore discussed. It can be readily kept in stock in the dry state, since it is non-hygroscopic and non-corrosive, and it can be dissolved as need therefor arises. It can be used in conjunction with solder that melts at relatively low temperatures, and with a wide variety of metals, and it assures a clean surface and ready flow of the solder thereon to effect an efficient junction of the elements to be soldered.

While it is preferred to make the flux of a saturated solution of the aniline hydrochloride in iso-propyl alcohol, it is to be understood that within the broader aspects of this invention a non-saturated solution may be used, or other suitable solvents may be used, or even aniline hydrochloride may be employed in its solid state. Reference is therefore to be had to the claims hereto appended for a definition of the limits of the invention.

What is claimed is:

1. A soldering flux comprising a solution of aniline hydrochloride.

2. A soldering flux comprising aniline hydrochloride dissolved in iso-propyl alcohol.

3. A soldering flux comprising aniline hydrochloride.

4. In the art of soldering, the step of cleaning the metal surfaces and facilitating the flow of solder thereon which comprises applying aniline hydrochloride thereto and releasing hydrogen chloride therefrom by heat.

5. In the art of soldering, the step of cleaning the metal surfaces and facilitating the flow of solder thereon which comprises applying a solution of aniline hydrochloride thereto, evaporating the solvent, and releasing hydrogen chloride from the aniline hydrochloride.

6. In the art of soldering, the step of cleaning the metal surfaces and facilitating the flow of solder thereon which comprises applying a solution of aniline hydrochloride in iso-propyl alcohol thereto, evaporating the alcohol, and releasing hydrogen chloride from the aniline hydrochloride by heat.

In testimony whereof I have signed this specification.

CHARLES D. LAWHON.

DISCLAIMER 1,748,180.—*Charles D. Lawhon*, Knoxville, Tenn. SOLDERING FLUX. Patent dated February 25, 1930. Disclaimer filed April 24, 1931, by the assignee, *The Fulton Sylphon Company;* patentee said *Lawhon* assenting.

Hereby enters its disclaimer of claims 3 and 4 of said Letters Patent No. 1,748,180, reading as follows:

"3. A soldering flux comprising aniline hydrochloride.

"4. In the art of soldering, the step of cleaning the metal surfaces and facilitating the flow of solder thereon which comprises applying aniline hydrochloride thereto and releasing hydrogen chloride therefrom by heat."

[*Official Gazette May 19, 1931.*]